J. BURKE.
ALTERNATING CURRENT MOTOR.
APPLICATION FILED FEB. 7, 1917.

1,296,620.

Patented Mar. 11, 1919.

James Burke Inventor
By his Attorneys
Edwards, Sager & Richmond.

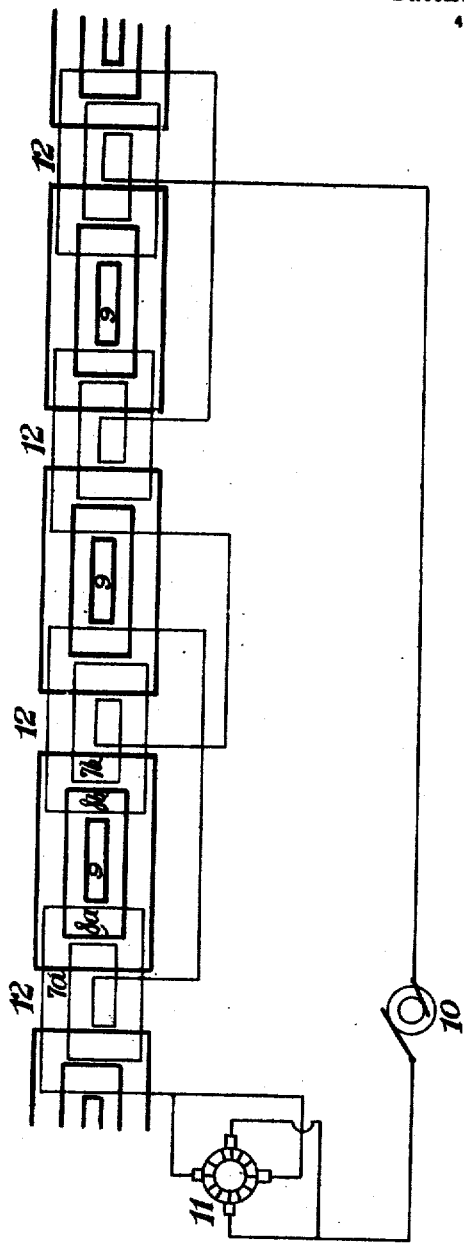

UNITED STATES PATENT OFFICE.

JAMES BURKE, OF ERIE, PENNSYLVANIA, ASSIGNOR TO BURKE ELECTRIC COMPANY, A CORPORATION OF PENNSYLVANIA.

ALTERNATING-CURRENT MOTOR.

1,296,620.  Specification of Letters Patent.  Patented Mar. 11, 1919.

Application filed February 7, 1917. Serial No. 147,067.

*To all whom it may concern:*

Be it known that I, JAMES BURKE, a citizen of the United States, residing at Erie, in the county of Erie and State of Pennsylvania, have invented certain new and useful Improvements in Alternating-Current Motors, of which the following is a specification.

My invention relates to alternating current motors of the single phase commutator type and is especially applicable to the series type.

The main object of my invention is the production of a motor of this type which will be efficient in starting and running qualities, of good power factor, and operate without objectionable sparking under all conditions. By reason of the various electromagnetic actions and interactions occurring in the series type of alternating current motor which do not occur when direct current is used, the power obtainable from the same size of motor with alternating current is much reduced compared with that obtainable with direct current. Likewise by reason of various electromagnetic actions and interactions occurring with the use of alternating current supply, the sparking at the brushes is much more severe and injurious than with direct current. I have found that by my improved construction of armature and stator, the relationship of the parts gives a coördination and interaction which overcomes all of the difficulties above referred to when alternating current is used, giving a motor of satisfactory power and efficiency at high power factor and also avoiding serious sparking at the brushes.

My invention will be understood from the following description and accompanying drawings, wherein—

Fig. 4 is a general diagram of connections and stator windings.

Figure 1:
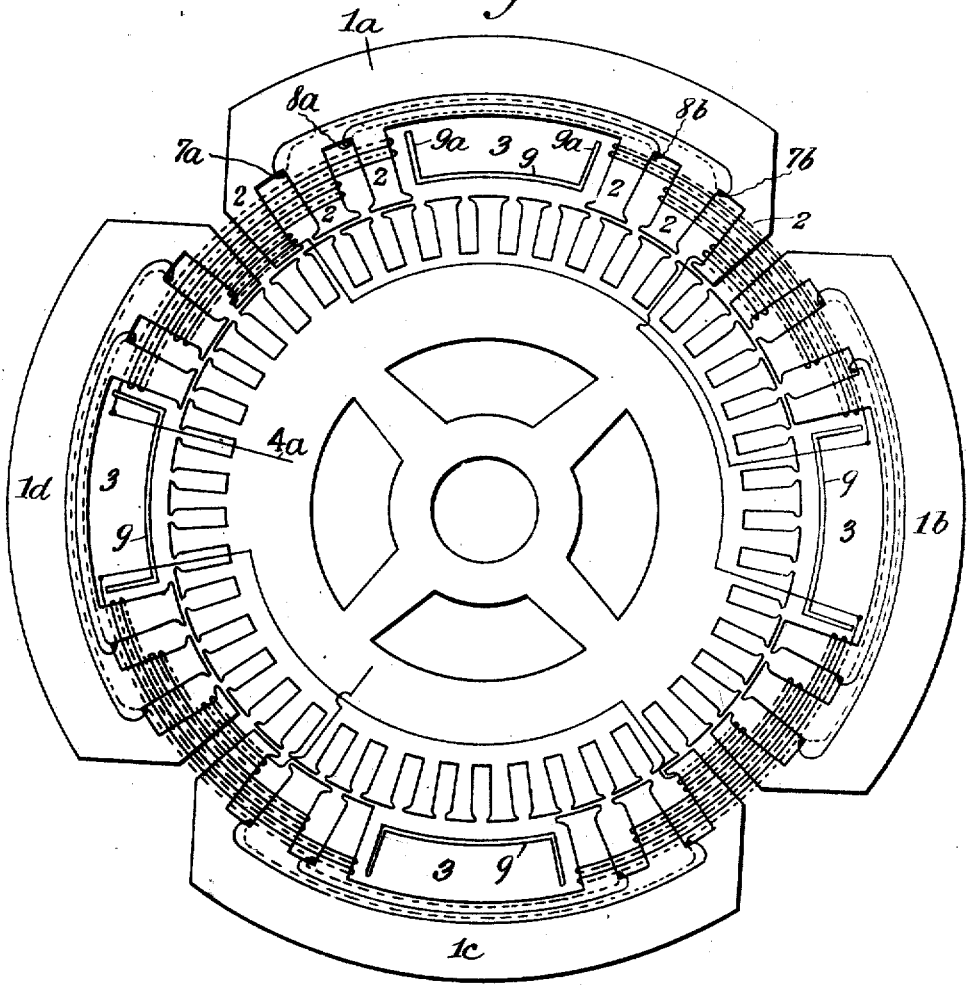
Figure 1 is a side view of the laminæ of the stator and rotor with the stator windings diagrammatically indicated.

Fig. 1 shows my preferred form of the stator magnetic element and armature core. A four pole field element is illustrated although any desired number of poles may be utilized. The field magnetic element is divided into the same number of sections as there are poles, the separate sections being designated $1^a$, $1^b$, $1^c$ and $1^d$, each section being made up of laminæ to the desired depth of the form shown having teeth 2 and a large central opening 3. Each field section is spaced from adjoining sections and as shown is spaced about the width of a slot between the teeth. Each section is cut away at the outer corners, which tends to reduce the magnetic conductivity between adjoining sections. The four magnetic sections are of course suitably supported in a housing or frame, preferably non-magnetic, to retain the relative positions shown.

The teeth at the end of each magnetic section coöperate with the teeth at the end of an adjoining section to form a field pole; thus the field winding, which is distributed, is indicated as made up of three coils per pole, the number of turns per coil being of a suitable number and of course much larger for this type of motor than the two turns indicated, this number being shown for convenience. Taking the upper left hand pole, the field winding is shown as starting at $4^a$, the first field coil embracing three teeth of magnetic section $1^d$ and three teeth of section $1^a$. This coil is connected in series with the next coil which embraces two teeth of section $1^d$ and two teeth of section $1^a$; this coil is in turn connected in series with the inner coil which embraces one tooth of each adjoining section. The next field coil similarly embraces the teeth of section $1^a$ and $1^b$, the direction of the current through the coils of this pole being reverse to that of the one just described and as indicated in the connections of Fig. 1. The remaining field poles are similarly wound, successive poles being wound to give alternate polarity. Although the three coils of each pole are described as being concentric with each other, they may in some cases be of the same size and distributed and overlapping so as to each embrace the same number of teeth.

Figure 2:
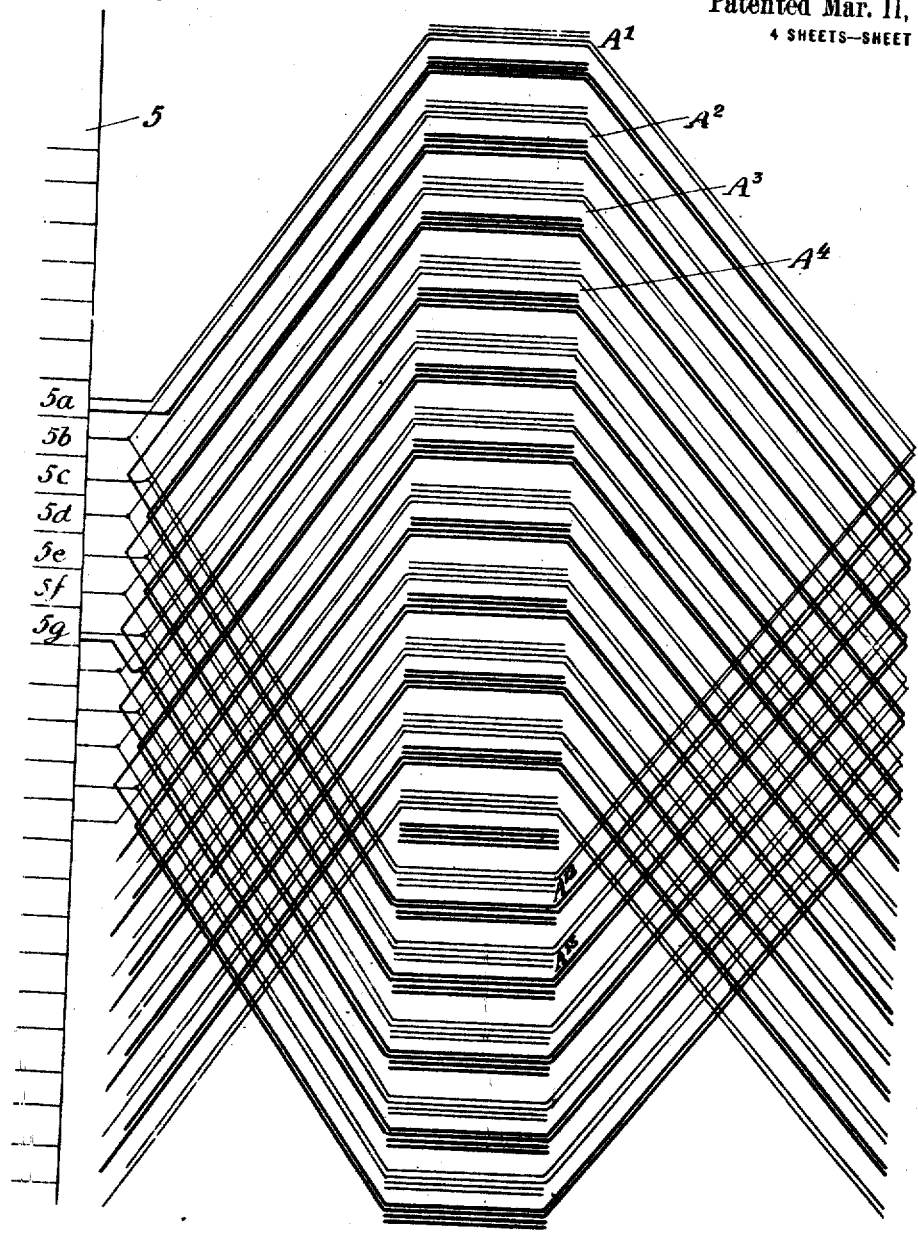
Fig. 2 is a diagram of a portion of the rotor windings indicating the same in development.

The armature is made up of laminæ of the form shown in Fig. 1 with teeth in unsymmetrical relation to the teeth of the field poles, the armature having 45 slots in this instance. The armature winding, indicated in Fig. 2 is made up of two distinct windings, one of higher and one of lower resistance, directly connected together at certain points. One of the armature windings of higher resistance is connected as usual to the commutator, but the other winding, of lower resistance, is so connected to the first winding or to the commutator bars of the first winding that although the turns of the first winding are successively short-circuited by the brushes in the usual manner, yet no turns of the other armature winding are ever directly short-circuited by the brushes. A portion of the commutator is indicated at 5. In this instance the pitch of the windings is 1 to 12, and the connections of the winding of higher resistance will be understood by tracing a few of the turns. Starting from commutator bar $5^a$ and following the upper conductor connected thereto upwardly, the turn passes through slot $A^1$, then downwardly to armature slot $A^{12}$ upwardly to commutator bar $5^b$, then again through armature slot $A^1$, downwardly to armature slot $A^{12}$, upwardly to commutator bar $5^c$ and through slot $A^2$ downwardly to slot $A^{13}$, upwardly to commutator bar $5^d$ and to slot $A^2$ and so on. Although two turns per coil of this winding are indicated, for simplicity, it will be understood that the actual number used will be much greater for this type of motor and that the number of commutator bars connected at intermediate points of the coils of this winding may be varied to suit the particular requirements, the greater the number of commutator bars used resulting in a less number of armature turns being short-circuited at any given instance, as well understood by those skilled in the art. Taking now the other winding of the armature of lower resistance there are indicated for illustration four conductors of this winding in each slot spaced apart slightly, for clearness, from the four conductors of the first winding in the same slot. Taking the lower resistance winding and starting at commutator bar $5^a$, for illustration, the conductor goes upwardly and then to the right through slot $A^1$ then passes down to slot $A^{12}$, thus having the same pitch as the winding first referred to, then passes upwardly to slot $A^1$ and down to slot $A^{12}$, then up to slot $A^2$, down to slot $A^{13}$ and so on in a manner similar to the winding first described, except that the connection to the commutator bars is not like that of the first winding. The second winding will of course have a larger number of turns per coil than shown in Fig. 2, but the resistance of this winding will be less than that of the winding first described. I have found that in practice good results are obtained with the size of the second winding about double that of the size of wire of the first winding. Electrical connection is made between the two armature windings so that the bridging of adjoining commutator bars by a brush in the rotation of the armature will successively short-circuit each set of turns of the first winding, but will never short circuit any set of turns or coils of the other winding. Thus, although the first winding has its successive sets of turns connected directly to the commutator bars, the other winding is shown connected to the first so that there are a plurality of commutator bars to which the second winding is not connected, excepting indirectly through the turns of the first winding. Thus the connections of both windings to commutator bar $5^a$ gives a cross connection between the windings at that point; another cross connection is made at commutator bar $5^g$, and so on. Thus several sets of turns connected to commutator bars of the first winding intervene between the points at which it is connected to the second winding, these cross connections being of course similarly spaced as indicated in Fig. 2. It is thus apparent that if a circuit be followed from commutator bar $5^a$ through the second winding, it will be found that several coils of the second winding are included between commutator bar $5^a$ and the next connection of this second winding to the commutator. There is consequently no opportunity for the commutator brushes to directly short circuit any of the coils of the second winding and commutation of the current in the coils of the second winding is never obtained by direct short circuit of its coils, but only by including in circuit therewith one or more coils of the first winding.

Figure 3:
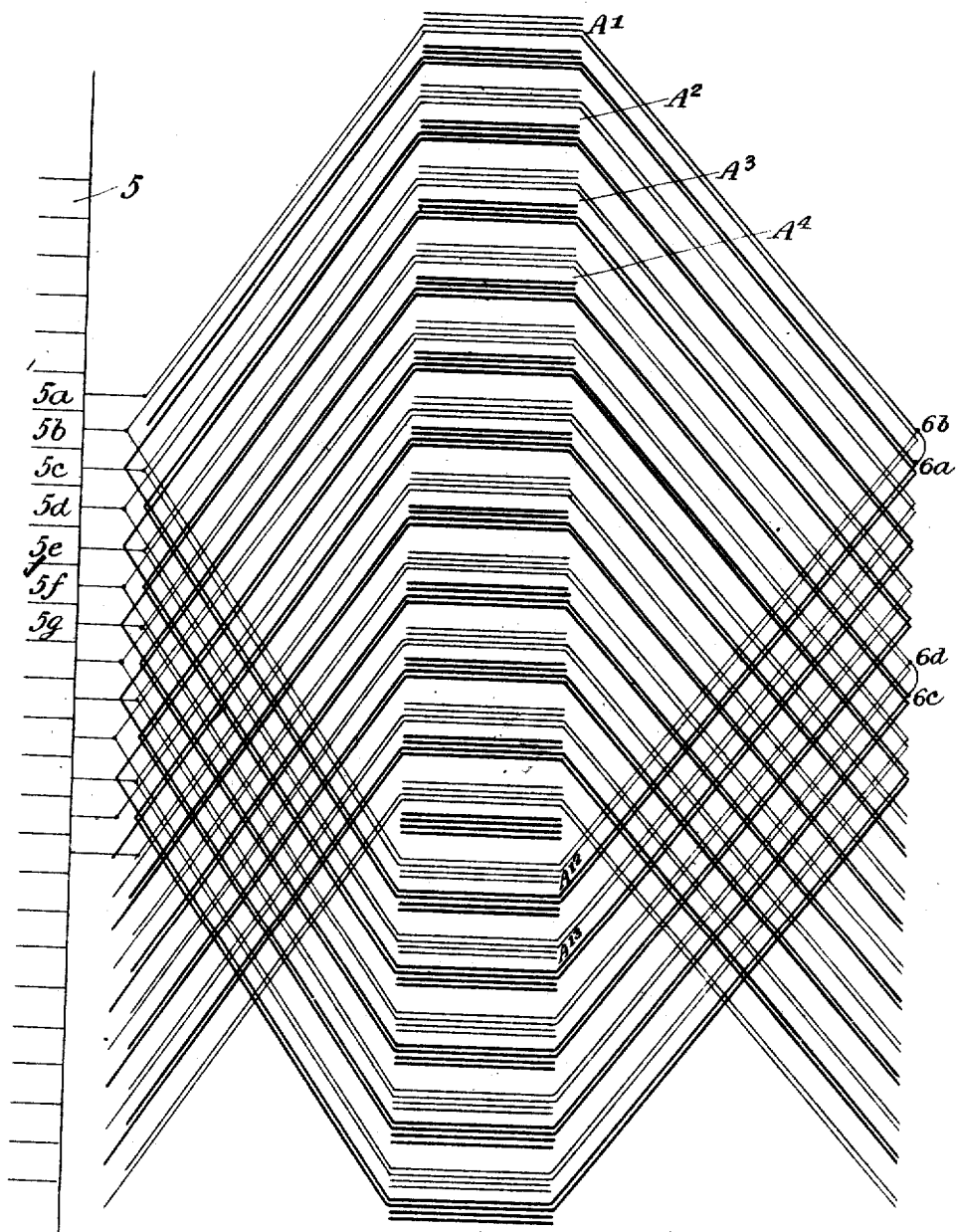
Fig. 3 is a similar diagram of another form of my invention.

In Fig. 2, the inter-connection between the two windings is shown and described as being made at the commutator bars. In some cases cross connections may be made between the two windings at other points and this may be found more desirable in some instances. Fig. 3 shows the same winding as indicated in Fig. 2, but the direct connections of the lower resistance winding to the commutator bars are omitted and cross connections are made between the two windings, in this case at the end of the armature which is opposite the commutator end. Thus from point $6^a$ of the lower resistance winding a cross connection is made to point $6^b$ of the higher resistance winding; another cross connection is made from point $6^c$ of the lower resistance winding to point $6^d$ of the higher resistance winding. Similarly additional cross connections would be made at corresponding points around the armature. In this case there is no direct connection of the lower resistance winding to the commutator bars and there is no opportunity of a brush directly short circuiting any coil of the low resistance winding, some portion of the higher resistance winding being always included in the circuit of the connection between the low resistance winding and the commutator bars. The number of cross connections used may be made at as many points as desired to suit the requirements of each particular case. For example, in this instance, a cross connection is shown at corresponding points in every third rotor slot, but in some cases a connection may be made at corresponding points in a greater or lesser number of slots.

Returning to the remaining windings of the stator, each magnetic field section 1ª, 1ᵇ, 1ᶜ and 1ᵈ is similarly wound with short-circuited windings. In one slot nearest one end of section 1ª is diagrammatically indicated a conductor 7ª, and in the corresponding slot at the other end of section 1ª is indicated a conductor 7ᵇ. These two conductors are closed on themselves by end connections as diagrammatically indicated, the coil having a very low resistance and may be in bar or plate form to secure the low resistance. Located in the nearest adjoining slots of magnetic section 1ª are conductors 8ª and 8ᵇ which are similarly closed on themselves by end connections, this coil similarly being of low resistance. In the central open space 3 of the magnetic section 1ª is located a plate 9 of low resistance and is shown as having outwardly extending ends 9ª, which may serve to conveniently hold the low resistance plate 9 in the position shown. There is thus provided a number of individually short circuited coils or conductors which are concentrically arranged.

Fig. 4 is a general diagram illustrating the circuit connections, the single phase source of energy being indicated at 10. The above described armature with its four brushes is indicated in general at 11 and is shown connected in series with the field windings 12 as already described. The low resistance plates 9 and low resistance conductors or coils 7ª, 7ᵇ, and 8ª, 8ᵇ, are also indicated in a general way in Fig. 3. The four commutator brushes are placed so as to commute the current in the coils when the latter are approximately in the neutral position in relation to the stator field.

In operation of the motor, the low resistance closed circuited coils above described are directly in the path of the alternating magnetic flux created by the armature and consequently currents are induced in the low resistance short circuited coils which tend to oppose and neutralize the alternating magnetic flux set up by the armature. These compensating coils and plate 9 being distributed concentrically and located as shown in relation to the armature serve to effectively fulfil their function in motors already constructed by me. The separated magnetic sections of the field element also serve to decrease the strength of the magnetic flux created by the alternating current passing through the armature by reason of the fact that there is no direct magnetic path for the magnetic flux through the stator between the adjoining magnetic poles of the armature, the sub-division of the magnetic laminæ of the stator in the manner above described serving to introduce air spaces of high reluctance in the path of the magnetic flux created by the armature.

It will be undertsood that when the armature coils are in the neutral position and in direct connection with the brushes through the commutator bars, they are in position to embrace the full strength of the magnetic field created by the stator field windings; consequently by reason of the alternations of the supply current, the coils in the neutral position are subjected to intense and rapid alternations of magnetic flux passing through them and by reason thereof, there is a tendency to induce strong alternating currents in the windings when in the neutral position. With the construction above described, the winding having its sets of turns successively connected to adjoining commutator bars and designated above as the first armature winding, has its sets of turns successively short circuited in the neutral position and the induced currents in this position would be so large that sparking at the brushes would be excessive and very objectionable, were it not for the fact that this winding is made of comparatively high resistance. By reason of this high resistance, the induced currents in the short circuited coils are not permitted to attain sufficient magnitude to give objectionable sparking. But if such a high resistance winding alone were used, the motor would be of low capacity and not be as efficient, as is desirable; consequently the provision of the armature winding above referred to as the second winding of lower resistance very materially raises the capacity and efficiency of the motor and likewise by reason of the interconnections between the windings above described, overcomes objectionable sparking at the brushes, by reason of the fact that the turns of the lower resistance winding are not directly short circuited by the commutator brushes, as above referred to. The above statements are merely general statements of the actions and interactions which are in themselves very complex and difficult to analyze. The result of the construction has, however, proved in practice to give an alternating current motor of this type of large capacity, high efficiency in starting and running, a high power factor and freedom from objectionable sparking.

Although I have described my invention in its preferred form, yet various modifications may be made therein without departing from the scope of my invention.

I claim:—

1. An alternating current motor having in combination a distributed field winding, distributed low resistance conductors on the field element short-circuited in a plurality of local circuits, and an armature having a winding distributed on its core connected to all the bars of said commutator and also having a winding distributed on its core connected to said first named winding at a less number of points than there are commutator bars.

2. An alternating current motor having in combination a magnetic field element divided into separate magnetic sections circumferentially, a distributed field winding thereon, low resistance short circuited conductors on said separated sections, and an armature having a winding distributed on its core connected to all the bars of said commutator and also having a winding distributed on its core connected to said first named winding at a less number of points than there are commutator bars.

3. An alternating current motor having in combination a magnetic field element divided into separate magnetic sections circumferentially, a distributed field winding having the windings creating each pole located upon adjacent portions of said sections, closed circuited conductors located on and confined to each of said sections respectively, and an armature of the commutator type.

4. An alternating current motor having in combination a magnetic field element divided into separate magnetic sections circumferentially, a distributed field winding having the windings creating each pole located upon adjacent portions of said sections, closed circuited conductors located on and distributed over and confined to each of said sections respectively, and an armature of the commutator type.

5. An alternating current motor having in combination a field element divided magnetically in sections in a circumferential direction, a distributed field winding, a plurality of distributed closed circuited conductors concentric with each other on said sections respectively, and an armature of the commutator type.

6. An alternating current motor having in combination a field element divided magnetically in sections in a circumferential direction, a distributed field winding, a plurality of distributed closed circuited low resistance coils concentric with each other on said sections respectively, and an armature of the commutator type.

JAMES BURKE.